(No Model.) 2 Sheets—Sheet 1.
O. E. H. KRAMER.
ELECTRIC MOTOR.
No. 545,592. Patented Sept. 3, 1895.
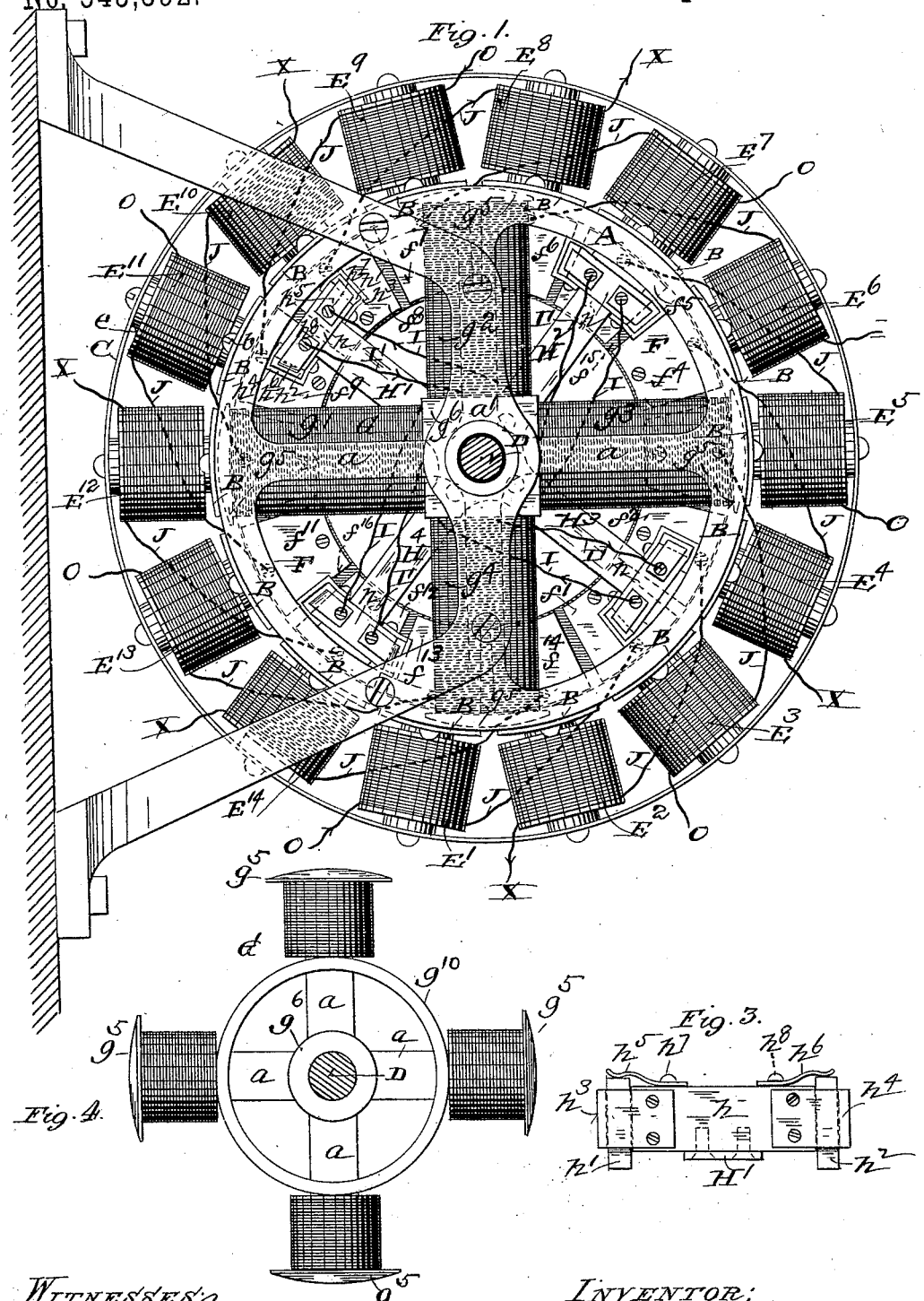
Witnesses:
Edward W. Currell
A. Bonville
Inventor:
Otto E. H. Kramer
By C. S. Moody
Th. Detty

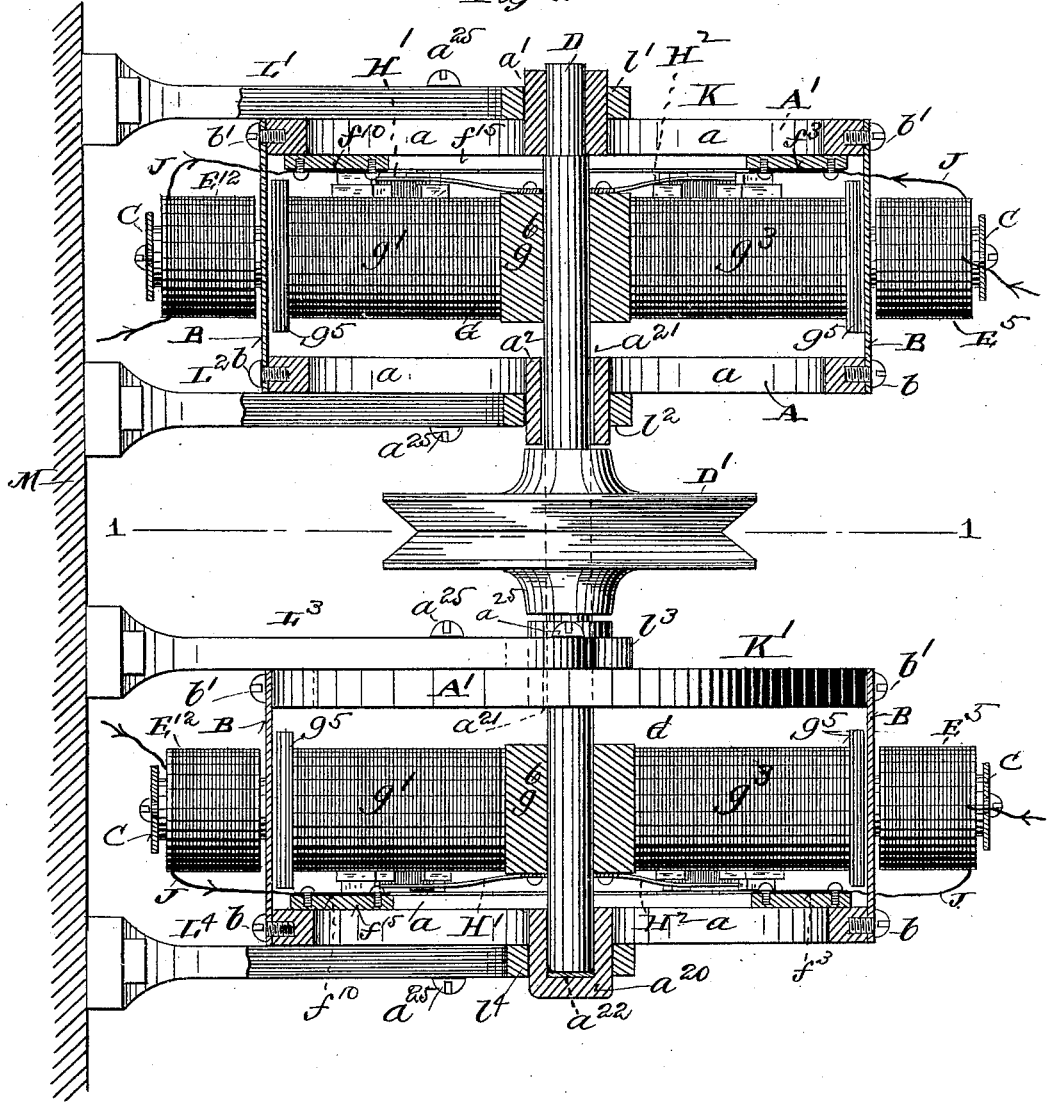

UNITED STATES PATENT OFFICE.

OTTO E. H. KRAMER, OF ST. LOUIS, MISSOURI.

ELECTRIC MOTOR.

SPECIFICATION forming part of Letters Patent No. 545,592, dated September 3, 1895.

Application filed May 10, 1894. Serial No. 510,744. (No model.)

*To all whom it may concern:*

Be it known that I, OTTO E. H. KRAMER, of St. Louis, Missouri, have made a new and useful Improvement in Electric Motors, of which the following is a full, clear, and exact description.

The present invention in a measure is allied to an improvement in electric motors described in an application for Letters Patent therefor filed April 23, 1894, and having the Serial No. 508,707, and which, in a general way, is composed of an outer circular series of stationary magnets and an inner straight spool-wound armature arranged and adapted to rotate within the circle of magnets. In the present construction I employ an outer circular series of stationary magnets and an inner rotating armature; but in place of a single motor I may use two or more motors or sets of magnets and armatures and arrange them side by side and adapt them to act either jointly or singly in imparting their motion; and, whether a single motor or two or more motors are used, the armature and commutator-brush in each motor are differently made, the magnets and wires differently connected, and the currents differently directed than in the construction referred to, all substantially as is hereinafter set forth and claimed, aided by the annexed drawings, making part of this specification, in which—

Figure 1 is a horizontal section looking upward on the line 1 1 of Fig. 2, which in turn is a vertical section of an electric motor constructed according to the principle of the present improvement; Fig. 3, a side elevation of one of the commutator-brushes, and Fig. 4 a view of a modified armature.

The same letters of reference denote the same parts.

The frame of the motor is similar to that of the motor referred to—that is, it consists mainly of an under ring A, an upper ring A', and the magnet pole-pieces B. An outer ring C is also employed as an additional element of the frame, but more especially for magnetic purposes. The rings A and A' are of any non-magnetizable metal, and they are united and suitably spaced apart, substantially as shown, by means of the pole-pieces B, and the pole-pieces are connected with the rings, preferably by means of the screws $b$ $b'$. The rings have inwardly-extending arms, $a$ that at their inner ends are shaped to form or are provided with bearings $a'$ $a^2$ for sustaining the motor-shaft D, substantially as shown.

$E'$, $E^2$, $E^3$, &c., represent a series of magnets extending circularly around the described frame. The series may consist of any desired even number, and in the present illustration fourteen magnets are shown. They are sustained in position by attaching them respectively to their pole-pieces B. The ring C is of iron, and it is attached to the magnet-spools $e$ at the outer end thereof.

F represents the commutator. It consists of a series of suitable metallic plates $f'$, $f^3$, $f^3$, &c., in number corresponding to that of the magnets, and belonging, respectively, to the magnets and arranged to form a circular series, substantially as shown. The plates are sustained by one of the rings, say the ring A', and are suitably insulated by means of insulating material $f^{15}$, substantially as shown. The plates are spaced evenly apart from each other, and the intervening spaces $f^{16}$ are filled with any suitable non-electric-conductor material that comes flush with the surface of the plates, so that the commutator-brushes have a continuous surface to travel upon.

G represents the armature. It is of suitable material and it is in the form of four arms $g'$, $g^2$, $g^3$, and $g^4$. Each arm is preferably spool-wound, substantially as shown, and each arm at the outer end thereof has a pole-piece $g^5$, and the arms at the inner ends thereof are attached to or center in a hub $g^6$, that is fastened to the motor-shaft D, all substantially as shown.

Four pairs of suitably-insulated commutator-brushes coact with the commutator-plates as the armature is rotated, and as follows: $H'$ $H^2$ $H^3$ $H^4$ represent four arms that are attached to the hub of the armature or shaft to rotate therewith. Each arm at its outer end carries a block $h$, of rubber or other insulating material, that in turn at its ends respectively carries pieces $h'$ $h^2$, of copper, brass, or carbon. These last-named pieces are the parts that brush against and coact with the commutator-plates, they are spaced apart from each other the length of a commutator-plate, and the brushes $h'$ $h^2$ in thickness are each equal to the width of the space $f^{16}$ between opposing commutator-plates. In this way the two brushes that each arm H', &c., carries are, in the rotation of the arm, at times in contact, respectively, with two commutator-plates and again out of contact with any commutator-plate. The preferred arrangement of all the brushes is shown—namely, so that two opposite sets of brushes (the two pairs carried, respectively, by the arms H' and H$^3$) shall be in contact, and the other two opposite sets (the two pairs carried, respectively, by the arms H$^2$ and H$^4$) shall be out of contact with the commutator-plates, and also so that the brushes of an arm shall be directly opposite the brushes of the opposite arm—that is, the brushes of the arm H' opposite the brushes of the arm H$^3$ and the brushes of the arm H$^2$ opposite the brushes of the arm H$^4$. The preferable mode of connecting the brushes $h'$ $h^2$ of each arm H', &c., with the block $h$ is by means of the clips $h^3$ $h^4$, the clips being secured to the block and extending sufficiently therefrom to admit the brushes, substantially as shown. Springs $h^5$ $h^6$, attached to the block $h$, serve to press the brushes properly against the commutator, and by being of suitable conductor material they also serve to conduct the currents passing through the brushes to and from the binding-screws $h^7$ and $h^8$, respectively, and from these screws, respectively, wires I and I' lead to the armature-arm belonging to those brushes, so that the electric current passing from the commutator-plate to one $h'$ brush of a pair can pass thence along the spring $h^5$ and wire I to the armature-arm, and thence back along the other wire I' and spring $h^6$ to the other $h^2$ brush of the pair, and thence to that other commutator-plate with which the brush $h^2$ is in contact. The brushes of the four arms H' H$^2$ H$^3$ H$^4$ are similarly respectively connected with the armature-arms $g'$ $g^2$ $g^3$ $g^4$.

The magnets are alternately connected with the positive and the negative pole of the battery or dynamo, the magnets of one set being connected by the wires O and the magnets of the other set by the wires X. The magnets are also successively operated in pairs—that is, the magnets E' and E$^2$ coact; then the magnets E$^2$ and E$^3$ coact; then the magnets E$^3$ and E$^4$, and so on around the series. Each magnet is connected with the commutator-plate by means of a wire J. The magnets are constructed so that they are alternately magnetized in opposite directions, and so that a magnet, when the armature is directly opposite it, repels the pole and the next magnet toward which the armature is moving attracts it. By this means each magnet and the one next to it in the direction of the movement of the armature coact favorably in effecting the movement of the armature.

The operation of the mechanism as thus far described is as follows: The current passing to the magnet E' passes thence over its wire J to the commutator-plate $f'$ belonging to that magnet, thence, in the manner described, from that plate to the armature-arm and back again to the commutator-plate $f^2$ belonging to the magnet E$^2$, and thence to the battery or dynamo. The armature is thereby moved opposite magnet E$^2$, whereupon a circuit is established through the magnets E$^2$ and E$^3$ and their commutator-plates, and the armature is drawn opposite magnet E$^3$, and so on around the circle of magnets, each magnet and the magnet beyond coacting to effect the revolution of the armature. The opposite armature-arm is being similarly actuated, and by means of the four armature-arms and coacting-brushes the operation is expedited, especially in view of the fact that the brushes of one pair of opposite arms are in contact with the commutator as the brushes of the other pair of arms are passing the intervals between the commutator-plates, substantially as indicated in the drawings. As, however, a single armature-arm and its pair of brushes are operative in combination with the magnets arranged and wired as described, I desire not to be restricted to the special number of armature-arms and brushes shown; nor, again, to the special relative arrangement shown of armature-arms when a number of them are employed, so long as the principle of the improvement is employed. I prefer the precise construction shown, as thereby a steadier as well as stronger power is obtained. In larger motors the armature may be made as in Fig. 4, the armature-arms being braced by the ring $g^{10}$ and the winding being confined to the outer portion of the arms, as shown.

An additional feature of the improvement is shown in Fig. 2—namely, a pair of motors attached to the same motor-shaft D. The motors K K' may be energized to operate either jointly or singly in driving the shaft, according as more or less power is required. The shaft is provided with a pulley D' for transmitting its motion, and this pulley is arranged between the motors, by which means the power of the motors, when both of them are in use, is applied more advantageously. L' L$^2$ L$^3$ L$^4$ are plumber-blocks for sustaining the motors. The blocks are attached to a support M, which, according as the motors are used horizontally or vertically, may be at the side or underneath the motors. The blocks respectively have bearings $l'$ $l^2$ $l^3$ $l^4$, in which the hubs $a^{20}$ of the rings A A' are held and adapted to be rotated therein when it is desired to adjust the motors, as presently mentioned. The shaft D is preferably journaled in the top and bottom bearings only, there being a clearance $a^{21}$ around the shaft in the intermediate bearings. When the motors are arranged horizontally, as in Fig. 2, the lower hub $a^{20}$ is preferably made in the form of a socket and the shaft is stepped in it, substantially as shown, in which manner the entire weight of the shaft and attachments is sustained in the lower hub. A wear-plate $a^{22}$ is generally used in the bearing, as shown. The rings A A' are made to be revolved in the bearings $l'$ $l^2$ $l^3$ $l^4$ to enable the entire motor, including the magnets, to be rotated to bring any of the magnets into a convenient position to be reached for repair or removal. When the motor is in use, its frame is fastened by means of the screws $a^{25}$ to the plumber-blocks.

I claim—

1. The combination of two motors whose armatures run on a single shaft and are supported solely in outer bearings, substantially as described.

2. The combination of two motors having stationary field magnets and revolving armatures said armatures being supported on a single shaft and the armature shaft carrying between the armatures a pulley, substantially as described.

3. The combination of two motors each having a circular series of stationary field magnets, and the armatures of both magnets being supported on a single shaft journaled at its ends only, in outer bearings and carrying midway between the armatures the pulley substantially as described.

4. The combination of the motor-frame and the plumber blocks, said frame being journaled in said blocks to be rotated when released, substantially as described.

5. The combination of the motor-frame having the socket, the motor shaft stepped in said socket, and the supports for said motor frame, substantially as described.

Witness my hand this 2d day of May, 1894.

OTTO E. H. KRAMER.

Witnesses:
C. D. MOODY,
A. BONVILLE.